US006230291B1

(12) United States Patent
Tokieda (10) Patent No.: US 6,230,291 B1
(45) Date of Patent: May 8, 2001

(54) MICROCOMPUTER INCLUDING BURN-IN TEST CIRCUIT AND BURN-IN TEST METHOD THEREOF INCLUDING MODE SWITCHING DEVICE

(75) Inventor: Yusuke Tokieda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/143,241

(22) Filed: Aug. 28, 1998

(30) Foreign Application Priority Data

Aug. 28, 1997 (JP) .................................................... 9-232848

(51) Int. Cl.[7] .............................. G11C 29/00; G11C 7/00
(52) U.S. Cl. ......................... 714/718; 235/492; 324/512; 324/765; 365/201
(58) Field of Search .................................... 714/724, 718; 235/492; 324/754, 757, 762, 760, 764, 765, 770, 512; 365/189.01, 189.07, 191, 193, 201, 222, 210, 230.06

(56) References Cited

U.S. PATENT DOCUMENTS

| 5,506,396 | * | 4/1996 | Asami .................................. 235/492 |
| 5,534,786 | * | 7/1996 | Kaneko et al. ...................... 324/760 |
| 6,006,345 | * | 12/1999 | Berry, Jr. ............................. 714/718 |

FOREIGN PATENT DOCUMENTS

| 197 11 478 | 10/1998 | (DE) . |
| 0 018 736 | 11/1980 | (EP) . |
| 0 556 826 | 8/1993 | (EP) . |
| 63-184142 | 7/1988 | (JP) . |
| 2-105231 | 4/1990 | (JP) . |
| 4-162143 | 6/1992 | (JP) . |
| 4-238543 | 8/1992 | (JP) . |
| 5-12458 | 1/1993 | (JP) . |
| 9-274611 | 10/1997 | (JP) . |
| 10-11316 | 1/1998 | (JP) . |

* cited by examiner

Primary Examiner—Emmanuel L. Moise
(74) Attorney, Agent, or Firm—McGinn & Gibb, PLLC (57) ABSTRACT

This invention discloses a microcomputer and a method of its burn-in test in which the burn-in test for detecting the initial defects of the parts necessary to detect the defects of the microcomputer is carried out while keeping the microcomputer mounted on the same burn-in test device. When a burn-in test mode signal is activated by a mode decoder, a mode switching circuit carries out switching so as to activate either one of a ROM dump mode signal or a test ROM execution signal, by means of a mode switching signal from a mode switching terminal. A central processing unit dumps data of the user ROM when the ROM dump mode signal is activated, and executes a program stored in the test ROM when the test ROM execution signal is activated, to gain access to various parts of the microcomputer. A reset signal is used as the mode switching signal.

12 Claims, 5 Drawing Sheets

MICROCOMPUTER INCLUDING BURN-IN TEST CIRCUIT AND BURN-IN TEST METHOD THEREOF INCLUDING MODE SWITCHING DEVICE

BACKGROUND OF THE INVENTION

1. Field of the Invention

The present invention relates to a microcomputer and a burn-in test method thereof and more particularly a microcomputer including a burn-in test circuit and a burn-in test method thereof.

2. Description of the Related Art

There has been known a microcomputer which is provided with a testing function by which a test mode for testing its operation can be set from the outside, in addition to the user mode for the use by the user. As the operation test of the microcomputer, a burn-in test by which the initial defects of the microcomputer are checked by operating it under the conditions of application of thermal and electrical stresses is generally employed.

Figure 5:
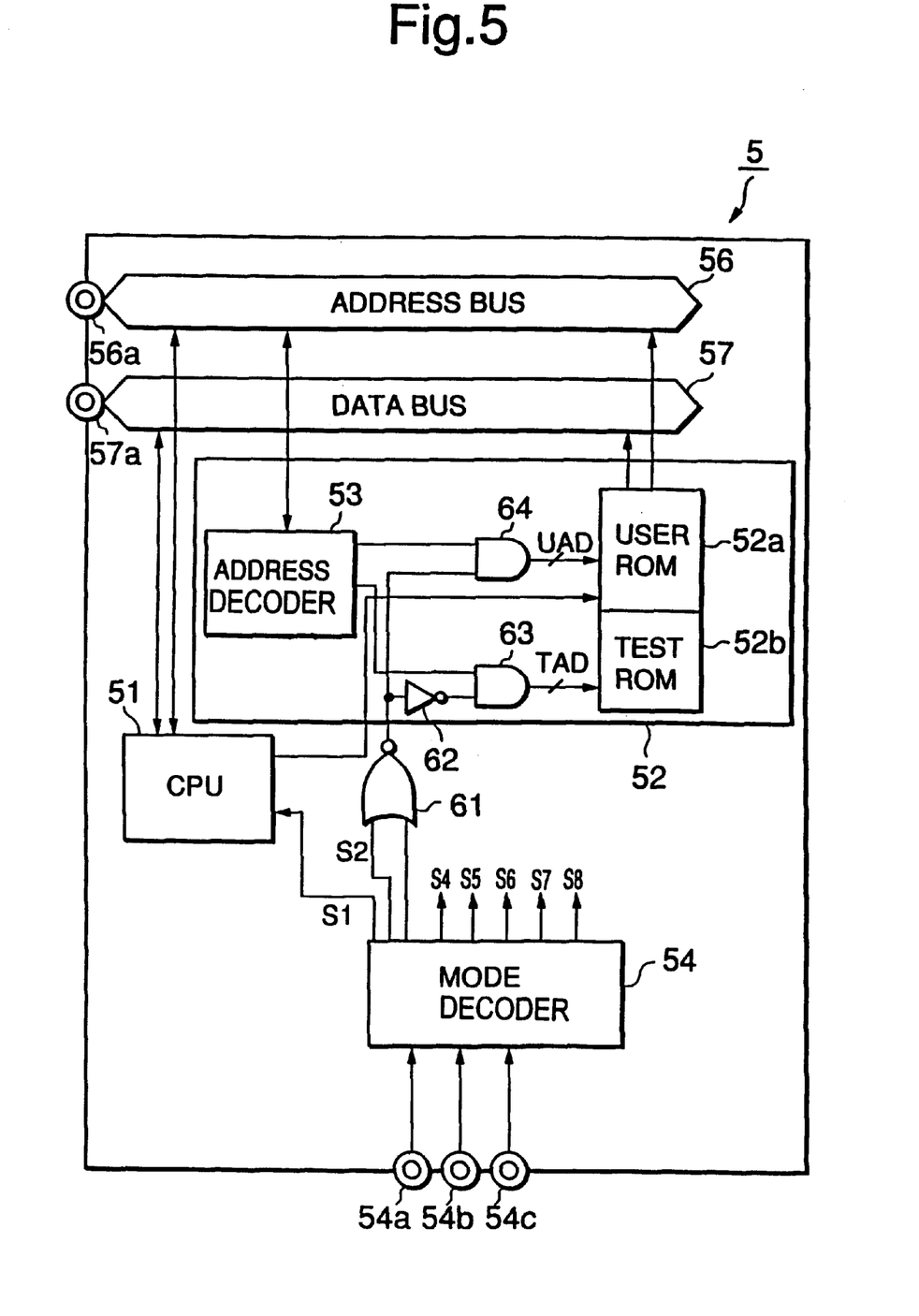
FIG. 5 is a block diagram showing the configuration of a conventional microcomputer.

An example of the conventional microcomputer for which the test mode can be set from the outside is shown in FIG. 5.

A microcomputer 5 is composed of a central processing unit (CPU) 51, a ROM 52, a mode decoder 54, an address bus 56, a data bus 57, and a NOR circuit 61. The ROM 52 is composed of a user ROM 52a, a test ROM 52b, an address decoder 53, AND circuits 63 and 64, and a NOT circuit 62. The user ROM 52a and the test ROM 52b respectively have address lines corresponding in numbers to their addresses, and access to them can be gained when the address lines are activated.

The test mode for the microcomputer 5 can be set at either one of ROM dump mode (for a ROM dump mode signal S1 of "1"), burn-in test mode (for a burn-in test mode signal S2 of "1"), or test ROM execution mode (for a test ROM execution mode signal S3 of "1") according to the mode set signals input to mode set terminals 54a to 54c.

In the burn-in test, since the voltages applied to respective terminals of the microcomputer 5 are determined according to the wiring connection of the burn-in test device on which the microcomputer 5 is mounted, the mode set signals input to the mode set terminals 54a to 54c of the microcomputer 5 are determined accordingly. It is true that the turn-in test mode signal S2 and the test ROM execution mode signal S3 are effectively the same, so that the burn-in test can also be carried out by setting the test ROM execution mode.

In the burn-in test mode, the burn-in test mode signal S2 alone is set exclusively at "1" (high level) by the mode set signals determined in accordance with the wiring connection of the burn-in test device. In this case, an address signal TAD is supplied to the address lines of the test ROM 52b via the NOR circuit 61, the NOT circuit 62, and the AND circuit 63, and the CPU 51 gains access to the test ROM 52b according to the address decoded by the address decoder 53. In this way, the test program in the test ROM 52b is executed.

Here, the test program is for operating various parts of the microcomputer 5. Namely, while letting the CPU 51 execute the test program in the test ROM 52b, it lets various sections of the microcomputer 5 operate under the conditions of application of thermal and electrical stresses to perform the burn-in test. After the completion of the burn-in test, the program in the test ROM 52b is executed in the test ROM execution mode (where no thermal stress is applied to the microcomputer 5), and initial defects in the microcomputer 5 are detected by verifying the data output via an external input/output terminal 56a of the address bus 56 and an external input/output terminal 57a of the data bus 57.

However, in the conventional microcomputer 5 described above, in the burn-in test mode, access to the user ROM 52a is not gained since an address signal UAD is not supplied to the address lines of the user ROM 52a. That is, in the burn-in test mode, the user ROM 52a is not subjected to an electrical stress. Accordingly, even if a burn-in test is carried out by mounting the microcomputer 5 on the burn-in test device, and storage contents of the user ROM 52a is dumped under the condition where the normal thermal stress is not applied, it is not possible to fully detect the initial defects of the user ROM 52a.

In the meantime, it is conceivable to make the mode set signals input to the mode set terminals 54a to 54c to serve as signals for the ROM dump mode in order to gain access to the user ROM 52a, and carry out the burn-in test of the microcomputer 5 in this state.

However, in this case there is required a burn-in test device for giving a mode set signal in the ROM dump mode, in addition to the burn-in test device for giving a mode set signal in the burn-in test mode. Moreover, it becomes necessary to demount the microcomputer 5 from the burn-in test device after the completion of the execution of the test program in the burn-in test mode, and mount it on a separate burn-in test device, which requires much labor.

As a microcomputer having the conventional burn-in test function one may mention the microcomputer disclosed in Publication of Unexamined Patent Applications No. Hei 4-238543. However, this invention discloses only the execution of a test program at the time of burn-in test, similar to the above, and no method of access to the user program storage area is disclosed.

SUMMARY OF THE INVENTION

It is an object of the present invention to provide a microcomputer and its burn-in test method which enables one to detect initial defects of sections that need defect detection by means of the burn-in test while mounting the microcomputer on the same burn-in test device.

It is another object of the present invention to provide a microcomputer and its burn-in test method which suppresses the increase in the cost of manufacture of the microcomputer without necessitating separate installation of terminals for the detection of initial defects in sections requiring defect detection in the burn-in test, and makes it possible to carry out a burn-in test using the conventional burn-in test device.

In order to achieve the above objects, the microcomputer according to a first viewpoint of this invention is a microcomputer provided with a user program storage means for storing a user program for service to the use of the user and a test program storage means for storing a test program for carrying out operation test, which has a switch signal input means for inputting, at the time of the burn-in test of the microcomputer, a switching signal capable of switching between access to the user program storage means and access to the test program storage means while mounting microcomputer on the same burn-in test device, wherein the access to the user program storage means and the access to the test program storage means can be switched in response to the input of the switching signal from the switch signal input means.

It should be noted that what is meant by the burn-in test in the above is an operation test for detecting initial defects under the conditions of application of thermal and electrical stresses to the microcomputer, and in reality, the initial defects of the microcomputer are detected from the data obtained by a normal test which is given following the burn-in test.

Moreover, the user program stored in the user program storage means and the test program stored in the test program storage means include not only programs in their literal sense but also data that are used in the programs.

With this arrangement, it is possible to gain access to both of the user program storage means and the test program storage means in the state where the microcomputer is mounted on the same burn-in test device. In other words, since the burn-in test can be carried out by applying an electrical stress also to the user program storage means access to which is not normally gained in the test program, it is possible to detect the initial defects at all locations which require defect detection.

In order to achieve the above objects, the microcomputer according to a second viewpoint of this invention is a microcomputer possessing a test function, and comprises a user program storage means for storing a user program to serve for the use of the user, a test program storage means for storing a test program for realizing the test function, a test mode setting means for setting a test mode for carrying out the burn-in test of the microcomputer, a mode switching means for switching, when the test mode is set in the test mode setting means, between a user program access mode for gaining access to the user program storage means and a test program execution mode for executing the test program stored in the test program storage means, by means of a reset signal supplied from the outside, a user program access means for gaining access to the storage area in the user program storage means when the user program access mode is set in the mode switching means, and a test program execution means for executing the test program when the test program execution mode is set in the mode switching means.

In the microcomputer in the above, it is possible to gain access to both of the user program storage means and the test program storage means while mounting the microcomputer on the same burn-in test device. In this way, it is possible to detect the initial defects at the sections requiring detection of the defects within the microcomputer by means of the burn-in test.

In the above microcomputer, the mode switching means is provided with, for example, a frequency division means in which the output state is changed whenever the switching signal is input, wherein it may be arranged such that the switching between the user program access mode and the test program execution mode is made by the output state of the frequency division means.

In the above microcomputer, the user program access means may be provided with, for example, a means for dumping the contents stored in the user program storage means.

When access to the user program storage means is gained by dumping the user program during the burn-in test as in the above, it is possible to readily carry out the burn-in test by applying an electrical stress to the user program storage means even without actually executing the user program.

In the microcomputer according to the first or second viewpoint, it is preferable that the mode switch signal is the reset signal for the microcomputer. Namely, when the reset signal is used for the mode switching, at the time of burn-in test there is no need for separately providing a terminal for switching the operation mode on the microcomputer, which prevents the increase in the cost of manufacturing the microcomputer.

Moreover, the conventional burn-in test device in which all terminals except for the clock input terminal and the reset input terminal are fixed, may also be used for the burn-in test of the microcomputer. Besides, the increase in the number of signals to be supplied to the microcomputer during the burn-in test can be suppressed, so that unstable operation of the microcomputer for use at high temperatures can be prevented.

Furthermore, in order to achieve the above objects, the burn-in test method according to a third viewpoint of this invention is a microcomputer burn-in test method provided with a user program storage means for storing a user program for service to the use of the user and a test program storage means for storing a test program for carrying out operation test, and includes a burn-in test mode setting step of setting a burn-in test mode for burn-in testing of the microcomputer, an operation mode switching step of switching the operation mode, when the burn-in test mode is set in the burn-in test mode setting step, to either one of a user program access mode for gaining access to the user program storage means or a test program execution mode for executing the test program stored in the test program storage means in accordance with a reset signal supplied from the outside, a user program access step of gaining access to the storage area within the user program storage means when the operation mode is switched to the user program access mode in the operation mode switching step, and a test program execution step of executing the test program stored in the test program storage means when the operation mode is switched to the test program execution mode in the operation mode switching step, wherein the burn-in test of the microcomputer is executed by mounting the microcomputer on a burn-in test device in which the potentials applied to the terminals of the microcomputer are fixed except for the potentials for a clock terminal giving a clock signal for operating the microcomputer and a reset terminal giving the reset signal.

According to the burn-in test method in the above, it is possible to gain access to both of the user program storage means and the test program storage means while using the conventional burn-in test device as it is, and mounting the microcomputer on the burn-in test device.

It is to be noted that in the microcomputer according to this invention, there may arise a case in which there occurs a storage area where neither the user program nor the test program is stored, but no access is gained to such an area even during the execution of the user program. Because of this, even if the initial defects are not detected due to non-detection of the access in the burn-in test, there will be generated no problem in the execution of the user program.

BRIEF DESCRIPTION OF THE DRAWINGS

The above-mentioned and other objects, features, and advantages of this invention will become more apparent by reference to the following detailed description of the invention taken in conjunction with the accompanying drawings, wherein.

DESCRIPTION OF THE PREFERRED EMBODIMENTS

Referring to the accompanying drawings, the configuration of an embodiment of this invention will be described next.

Figure 1:
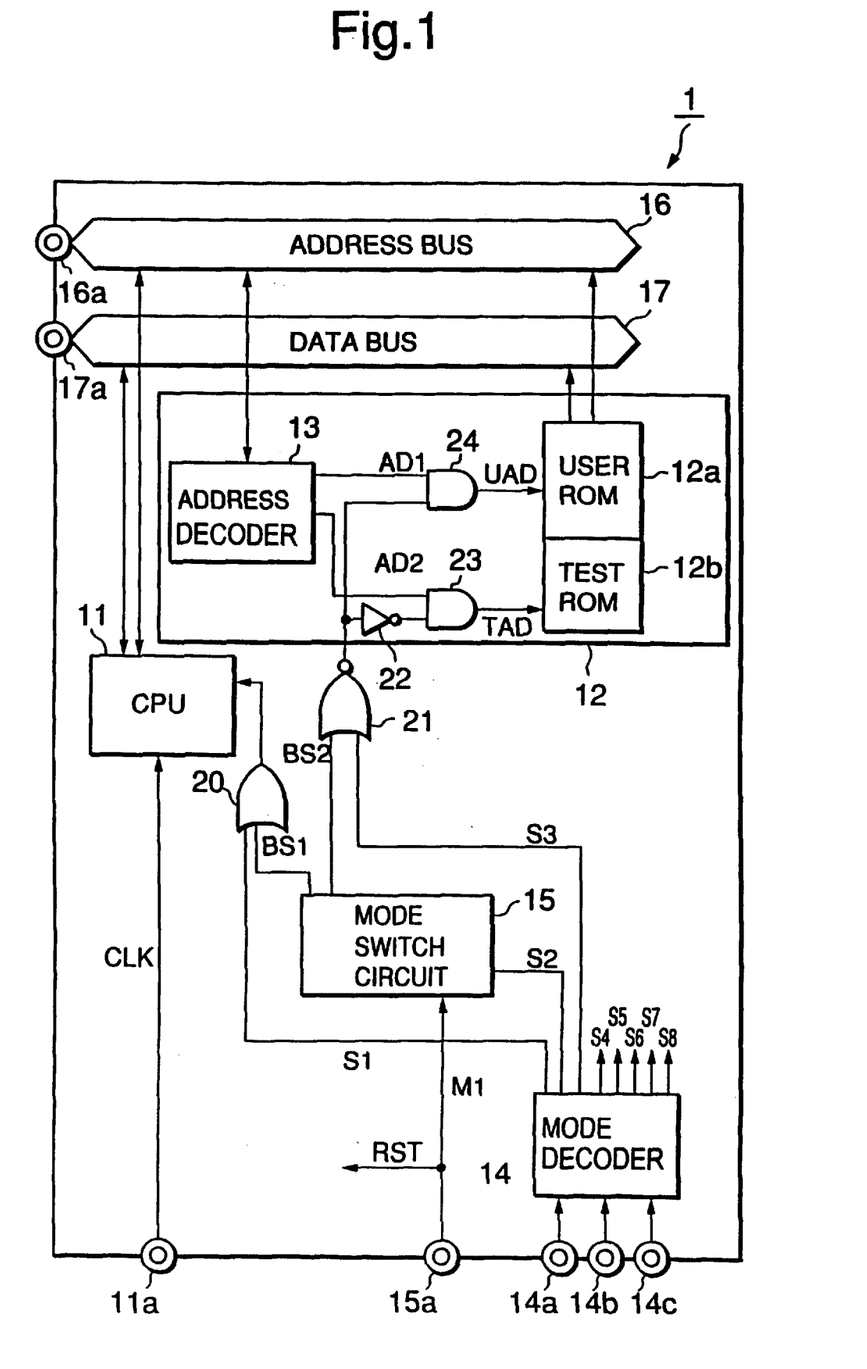
FIG. 1 is a block diagram showing the configuration of the microcomputer according to an embodiment of this invention.

FIG. 1 is a block diagram showing the circuit configuration of the microcomputer 1 according to the embodiment. As shown, the microcomputer 1 is composed of a CPU 11, a read only memory (ROM) 12, a mode decoder 14, a mode switch circuit 15, an address bus 16, a data bus 17, an OR circuit 20, and a NOR circuit 21. The ROM 12 is composed of a user ROM 12a, a test ROM 12b, an address decoder 13, a NOT circuit 22, and AND circuits 23 and 24.

The CPU 11 is provided with a clock input terminal 11a for supplying a clock signal CLK from the outside. In accordance with the clock signal CLK supplied via the clock input terminal 11a, the CPU 11 reads a program stored in the user ROM 12a in the case of a user mode, and a test program stored in the test ROM 12b in the case of a test mode, from the user ROM 12a and the test ROM 12b, respectively, via the data bus 17, and executes the program. The CPU 11 supplies an address indicated by an internal program counter or the address designated in the program to the address decoder 13 via the address bus 16. Besides, the CPU 11 controls data such as the program stored in the ROM 12 so as to be dumped in a ROM dump mode to be described later.

In the ROM 12, the user ROM 12a stores a user program to be served for the use of the user in the user mode. The test ROM 12b stores a test program to be used for the operation test of the microcomputer 1. The test program is a program consisting of a sequence of instructions for operating practically all parts of the microcomputer 1 except for the user ROM 12a. Here, the user program and the test program are not only the programs in their literal sense but also includes data for executing the programs. In the ROM 12, the addresses allocated to the user program 12a and the test program 12b may be either identical or different. Further, the user ROM 12a and the test ROM 12b respectively have address lines corresponding to the address numbers, and access to them can be gained by activating the address lines by means of address signals UAD and TAD that will be described later.

The address decoder 13 decodes an address supplied by the CPU 11 via the address bus 16, and generates and outputs address decode signals AD1 and of AD2 for activating the user ROM 12a and the test ROM 12b. The address decode signals AD1 and AD2 output from the address decoder 13 are supplied to the AND circuits 24 and 23, respectively. The CPU 11 sequentially supplies to the address decoder 13 addresses augmented by one, except for the case of executing a jump instruction or in the case of reading data to be used during the execution of the program.

The mode decoder 14 is provided with mode set terminals 14a to 14c for setting the operation mode of the microcomputer 1. Based on the mode set signals input through the mode set terminals 14a to 14c, the mode decoder 14 exclusively sets only one, out of a group of mode signals S1 to S8, to a "1" level (high level).

| MODE SET SIGNAL (MODE SET TERMINAL) | | | MODE SIGNAL GROUP | | | | | | | |
|---|---|---|---|---|---|---|---|---|---|---|
| 14a | 14b | 14c | S1 | S2 | S3 | S4 | S5 | S6 | S7 | S8 |
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

Of the group of mode signals S1 to S8, S1 is a ROM dump mode signal, S2 is a burn-in test mode (referred to as BT mode hereinafter) signal, and S3 is a test ROM execution mode signal. Signals S4 to S8 are signals of other modes such as the user mode, and description about them will be omitted.

In the burn-in test, the voltages to be applied to the terminals of the microcomputer 1 are determined in accordance with the wiring connection of the burn-in test device on which is mounted the microcomputer 1. Because of this, when the microcomputer 1 is mounted on the burn-in test device described later, the mode set signals to be input to the mode set terminals 14a to 14c are determined and the BT mode signal S2 is set at "1".

The mode switch circuit 15 is provided with a mode switch terminal 15a receiving a reset signal RST for switching the operation mode in the BT mode between the ROM dump mode and a test ROM execution mode. The reset signal RST is used for initializing various parts of the microcomputer 1 as well as for switching the mode in the BT mode. In the following description, the reset signal RST input from the mode switch terminal 15a to the mode switch circuit 15 will be referred to as a mode switch signal M1.

Figure 2:
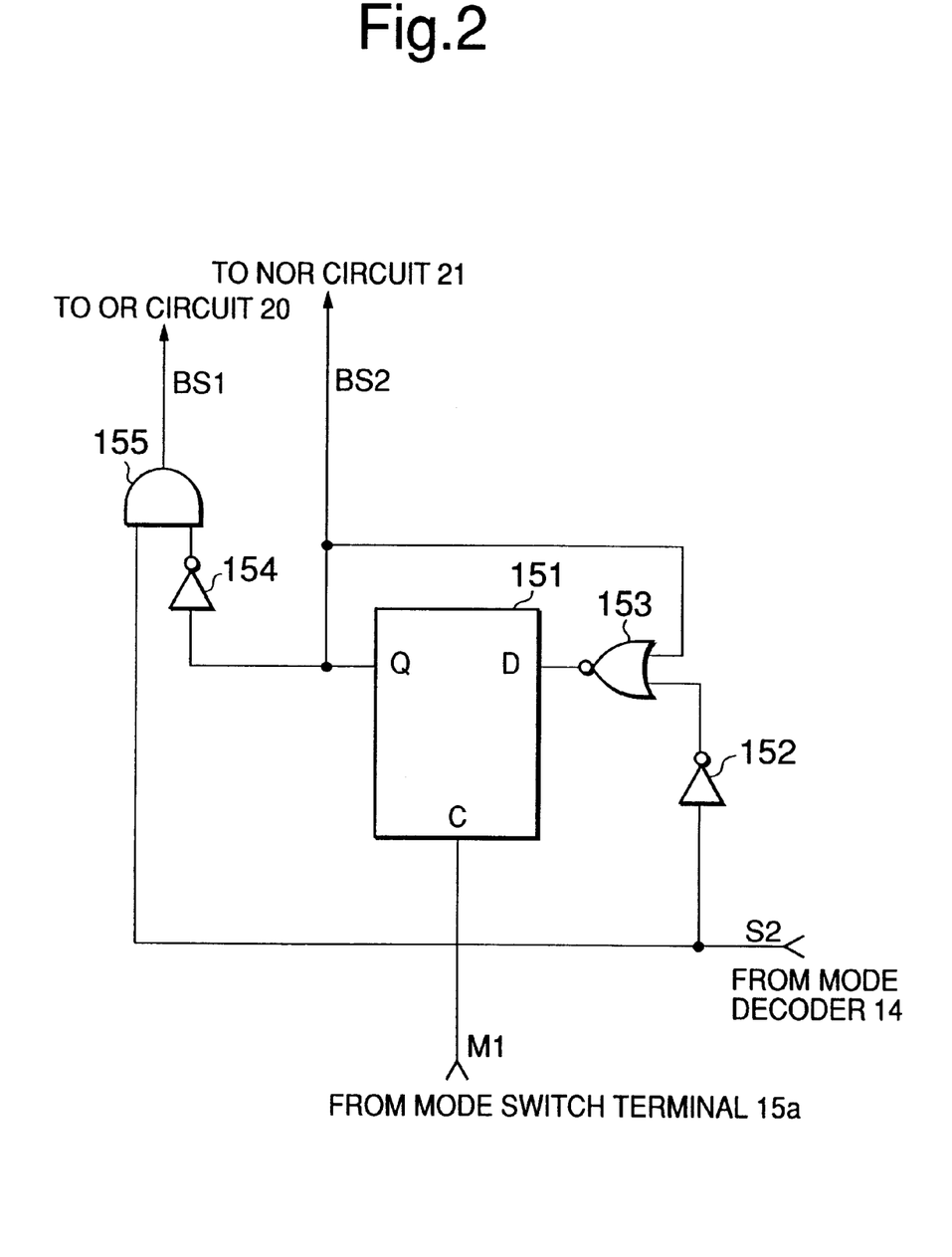
FIG. 2 is a block diagram showing the configuration of the mode switch circuit of the microcomputer in FIG. 1.

As shown in FIG. 2, the mode switch circuit 15 is composed of a D flip-flop 151, a NOT circuit 152, a NOR circuit 153, a NOT circuit 154, and an AND circuit 155.

The mode switch signal M1 from the mode switch terminal 15a is supplied to a clock input terminal C of the D flip-flop 151. The BT mode signal S2 is input to the NOR circuit 153 via the NOT circuit 152. Further, the output signal from an output signal terminal Q of the D flip-flop 151 is also input to the NOR circuit 153. By forming a frequency division circuit by inputting the output signal from the NOR circuit 153 to the D flip-flop 151, when the BT mode signal S2 is "1", the output of the D flip-flop 151 is alternately switched between "0" and "1" for every input of the mode switch signal S2. The output signal from the output signal terminal Q of the D flip-flop 151 is input to the AND circuit 155 via the NOT circuit 154. In addition, the BT mode signal S2 is also input to the AND circuit 155. With this arrangement, when the BT mode signal S2 is "1", the output of the AND circuit 155 is switched alternately between "1" and "0" for every input of the mode switch signal M1.

In other words, when the BT mode signal S2 is "1", a ROM dump signal BS1 of the BT mode and a test ROM execution signal BS2 of the BT mode are sent alternately to level "1" every time when the mode switch signal M1 is supplied to the mode switch circuit 15 from the mode switch terminal 15a.

In the ROM dump mode (namely, when the ROM dump mode signal S1 is "1"), data of the user ROM 12a is dumped without fixing the terminals of the microcomputer 1. In the test ROM execution mode (namely, when the test ROM execution mode signal S2 is "1"), the program stored in the test ROM 12b is executed without fixing the terminals of the microcomputer 1. On the other hand, in the BT mode, data dump of the user ROM 12a or the program stored in the test ROM 12b is executed according to the mode switch signal M1, in the state where terminals of the microcomputer 1 other than a clock input terminal 11a and the mode switch terminal 15a are fixed.

In the above, what is meant by fixation of a terminal is the fixation of the potential applied to the terminal.

The address bus 16 is provided with an external input/output terminal 16a, and is used for transferring the address supplied from the CPU 11 to the address decoder. In addition, it is used especially in the ROM dump mode, for outputting the address to the outside from the address external input/output terminal 16a along with the data stored in the user ROM 12a and the test ROM 12b. Moreover, it is possible to supply an address from the outside via the external input/output terminal 16a.

The data bus 17 is provided with an external input/output terminal 17a, and is used in the ROM dump mode (including the case in the BT mode) for outputting the data dumped by the user ROM 12a to the outside via the external input/output terminal 17a. In addition, the data bus 17 is used for transfer of an instruction stored in the user ROM 12a or the test ROM 12b to the CPU 11, or for outputting the output data resulting from the execution of the program stored in the user ROM 12a or the test ROM 12b to the outside via the external input/output terminal 17a. Besides, it is possible to supply data from the outside via the external input/output terminal 17a.

Note, however, that in the BT mode, the external input/output terminals 16a and 17a are fixed so that, in reality, it is limited to the execution of the output operation of the address or the data by the microcomputer 1, and neither the address nor the data is output to the outside.

The OR circuit 20 ORs the ROM dump mode signal S1 and the ROM dump mode signal BS1 in the BT mode, and supplies the result to the CPU 11. As a result, in the ROM dump mode (including the case in the BT mode) the CPU 11 controls the microcomputer 1 to dump the data in the user ROM 12a.

The NOR circuit 21 NORs the test ROM execution mode signal S3 and the test ROM execution mode signal BS2 in the BT mode, and the result is supplied to the AND circuit 23 via the NOT circuit 22, and further to the AND circuit 24. The AND circuits 23 and 24 AND these signals and the previously mentioned address decode signals AD2 and AD1, respectively. In this way, in the ROM dump mode (including the case in the BT mode), the address signal UAD output from the AND circuit 24 goes to "1", the address line of the user ROM 12a is activated and the access to the user ROM 12a is gained. In the test ROM execution mode (including the case in the BT mode), the address signal output by the AND circuit 23 goes to "1", the address line of the test ROM 12b is activated, and the access to the test ROM 12b is gained.

The NOT circuit 22 and the AND circuit 23, and the AND circuit 24 are provided in number equal to the number of the address lines of the test ROM 12b and the user ROM 12a, respectively, and the logical NOT and the logical AND are taken for respective circuits.

The microcomputer 1 is a device in which all the above components are integrated in a chip, and is provided with other terminals (not shown) such as power terminals for supplying a power supply for the operation.

Figure 3:
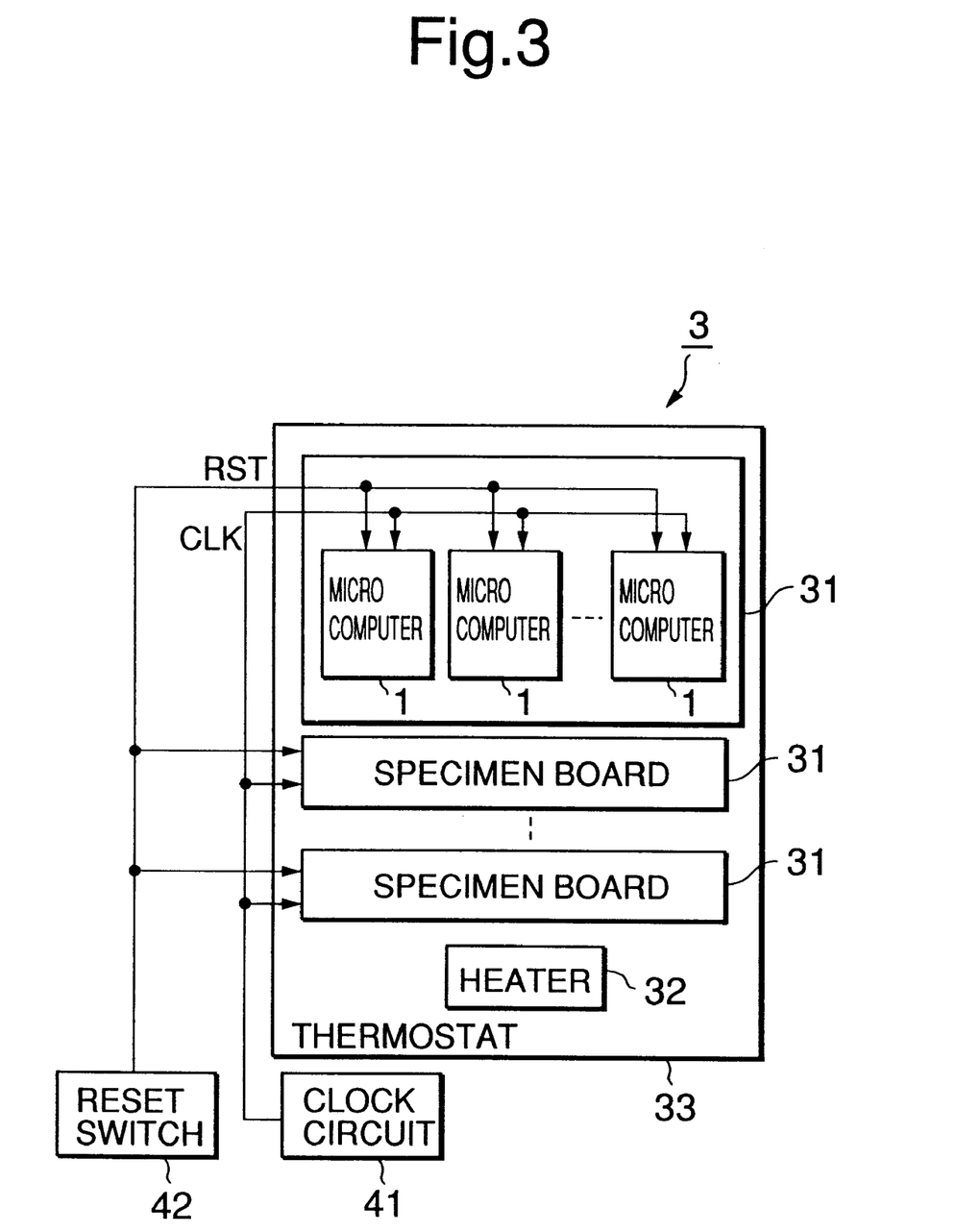
FIG. 3 is a block diagram showing the configuration of the burn-in test device for burn-in testing the microcomputer in FIG. 1.

Next, referring to a block diagram in FIG. 3, a burn-in test device 3 used for the burn-in test of the microcomputer 1 of the embodiment will be described.

As shown in the figure, the burn-in test device 3 is composed of a thermostat 33, a plurality of specimen boards 31 provided in the thermostat 33, and a heater 32. The specimen board 31 is provided with a plurality of sockets (not shown), and microcomputers 1 are mounted on these sockets. The burn-in test of the microcomputers 1 is carried out by heating the thermostat 33 with the heater 32.

When the microcomputer 1 is mounted on the specimen board 31, terminals other than the clock input terminal 11a and the reset input terminal 15a of the microcomputer 1 are connected to a power unit (not shown) or grounded. The external input/output terminals 16a and 17a are grounded. In this case, the mode set terminals 14a, 14b, and 14c are supplied with signals "0", "1", and "0", respectively. The clock input terminal 11a of the microcomputer 1 mounted on the specimen board 31 is supplied with a clock signal CLK from a clock circuit 41, and the CPU 11 is operated according to the clock signal CLK. A reset signal RST is supplied to the mode switch terminal 15a through the manipulation from the outside of a reset switch 42. The reset signal RST is used as the mode switch signal M1 as mentioned in the above. The microcomputer 1 is supplied with a power for its operation from the power unit via the power terminals.

Figure 4:
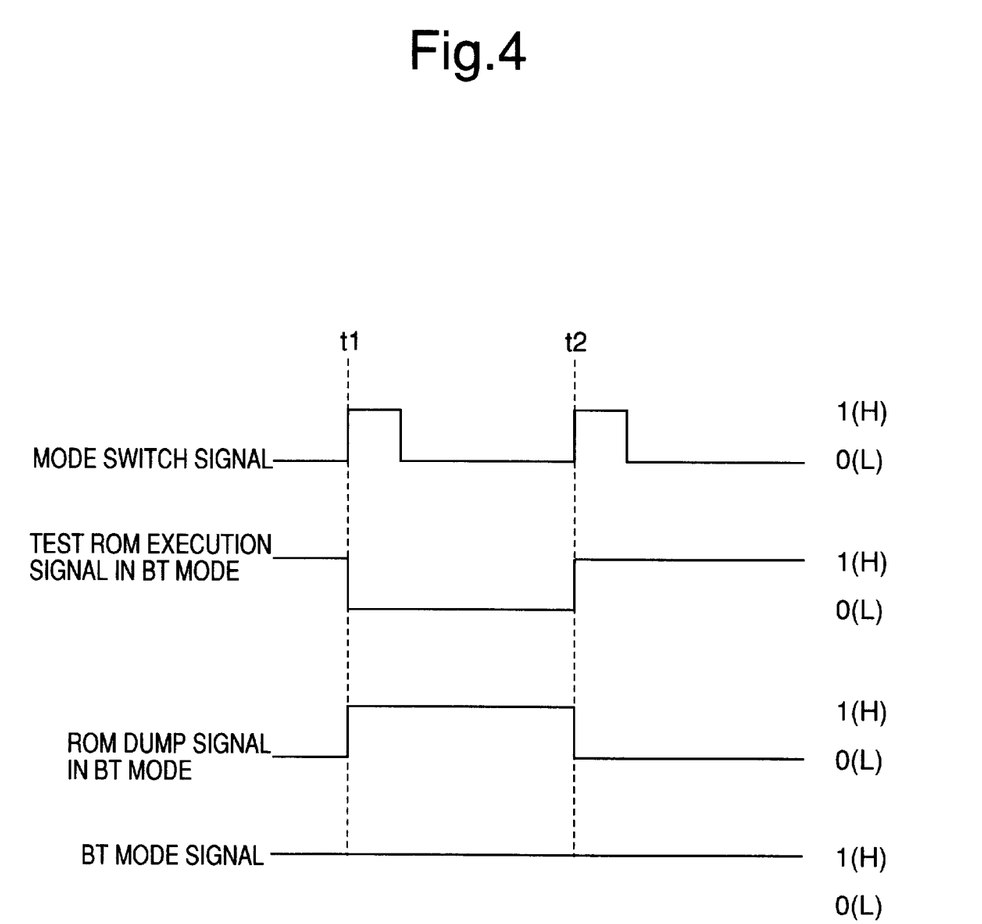
FIG. 4 is a timing chart for describing the burn-in test operation of the microcomputer according to the embodiment of this invention.

Referring to the timing chart in FIG. 4, the operation in the BT mode of the microcomputer 1 of this embodiment will be described.

Here, the microcomputer 1 is mounted on the burn-in test device 3, and the mode set signals supplied to the mode decoder 14 from the mode set terminals 14a, 14b, and 14c are fixed at "0", "1", and "0", respectively. With this arrangement, the burn-in test mode signal S2 is at "1" (high level), and the other mode signals S1, and S3 to S8 are at "0" (low level). In the initial state, the output signal from the output signal terminal Q of the D flip-flop of the mode switch circuit 15 is at "0", the ROM dump signal BS1 in the BT mode is at "0", and the test ROM execution signal BS2 in the BT test mode is at "1".

By inputting the reset signal RST from the mode switch terminal 15a through the manipulation of the reset switch 42, the mode switch signal M1 is input from a clock input terminal C of the D flip-flop 151 of the mode switch circuit 15. The D flip-flop constitutes a frequency division circuit, and the output signal output from the output signal terminal Q is inverted to "1" at the rise timing t1 of the mode switch signal M1. As a result, the ROM dump signal BS1 in the BT mode goes to "1", and the test ROM execution signal BS2 in the BT mode goes to "0".

In this case, the output of the NOR circuit 21 is at "1", and a high level address signal UAD is output from the AND circuit 24 to activate either one of the address lines of the user ROM 12a, realizing the access to the user ROM 12a. At the same time, the signal supplied to the CPU 11 from the OR circuit 20 goes to "0" (low level), and the CPU 11 dumps, according to the address decoded by the address decoder 13, the user program and its address stored in the user ROM 12a via the data bus 17 and the external input/output terminal 17a and the address bus 16 and the external input/output terminal 16a. In this way, access is gained to the inside of the user ROM 12a, and an electrical stress can be applied to it at the time of the burn-in test.

Next, by inputting the reset signal RST from the mode switch terminal 15a through another manipulation of the reset switch 42, the mode switch signal M1 is input to the clock input terminal C of the D flip-flop 151 of the mode switch circuit 15. The D flip-flop 151 constitutes a frequency division circuit, and the signal output from the output signal terminal Q is inverted at the timing t2 of rise of the mode switch signal M1 to go to "0". As a result, the ROM dump signal BS1 in the BT mode goes to "0" and the test ROM execution signal BS2 in the BT mode goes to "1".

In this case, the output of the NOR circuit 21 is "0", a high level address signal TAD is output from the AND circuit 23, and either one of the address lines of the test ROM 12b is activated. In this way, access to the test ROM 12b is gained, and the CPU 11gains access to the address of the test ROM 12b decoded by the address decoder 13. At the same time, the signal supplied to the CPU 11 from the OR circuit 20 goes to "1" (high level), and the CPU 11 executes sequentially instructions stored in the address in the test ROM 12b decoded by the address decoder 13. By the sequential execution by the CPU 11 of the program instructions stored in the test ROM 12b, essentially all parts (excluding the user ROM 12a) of the microcomputer 1 are put to operation.

After the completion of the burn-in test in the above, the test ROM execution mode and the ROM dump execution mode of the normal type, different from those of the BT mode, are executed. If there exists some kind of defect in the microcomputer 1, data in the user ROM 12a and the test ROM 12b are modified from what they should be inherently because of the application of the thermal and electrical stresses in the burn-in test. By executing the test program in the normal test ROM execution mode, data are output to the outside from the external input/output terminal 17a. By comparing these data with the data to be obtained inherently, it is possible to detect initial defects of the test ROM 12b. Moreover, it is possible to detect initial defects in the user ROM 12a by examining the storage contents of the user ROM 12a dumped by the normal ROM dump mode execution mode.

As described in the above, in the microcomputer 1 according to this embodiment, it is possible to operate the parts, including the user ROM 12a, of the microcomputer 1 which require the detection of the defects, by using the same burn-in test device. Namely, at the time of the burn-in test a thermal and an electrical stresses can be applied to the user ROM 12a as well. Moreover, terminals other than the reset terminal (the mode switch terminal 15a) and the clock input terminal 11a of the microcomputer 1 can be fixed, so that it is possible to simplify the configuration of the burn-in test device.

Moreover, the reset signal RST is used in the burn-in test for the switching between the ROM dump mode and the user ROM execution mode. Because of this, there is no need for installing a separate terminal in the microcomputer 1 for setting a mode for gaining access to the user ROM 12a. Accordingly, the number of terminals of the microcomputer 1 can be made to be equal to that of the conventional microcomputer, so that the manufacturing cost of the microcomputer 1 can be restrained.

Furthermore, by the use of the reset signal RST for the switching between the ROM dump mode and the ROM execution mode in the burn-in test, it is possible to carry out the burn-in test using the burn-in test device the same as the conventional one. In addition, since the number of input signals of the microcomputer 1 at the time of burn-in test is not increased, unstable operation will not occur even if the microcomputer 1 is operated at high a temperature.

In the above embodiment, the reset signal RST is used for the mode switch signal M1. Further, by employing the mode switch circuit 15 constructed centered around the frequency division circuit using the D flip-flop 151, the ROM dump mode and the user ROM execution mode in the burn-in test are switched for every input of the reset signal RST. However, the constitution of the mode switch circuit 15 may be selected arbitrarily provided that it is possible to output signals that can be switched between the high level and the low level for every input of the reset signal RST.

In the above embodiment, access to the user ROM 12a in the burn-in test mode is realized by adopting the ROM dump mode by which data in the user ROM 12a is dumped. However, it is also possible in the burn-in test to gain access to the user ROM 12a by employing a user mode which executes the program in the user ROM 12a.

In the above embodiment, the reset signal is used for switching between the ROM dump mode and the test ROM execution mode at the time of the BT mode. However, a separate signal may be used for the switching of the modes. In this case, although the number of signals to be supplied to the microcomputer from the outside at the time of the burn-in test is increased, it is possible to gain access to both of the user ROM and the test ROM while mounting the microcomputer on the same burn-in test device.

In the microcomputer 1 of the embodiment, the ROM 12 is divided into the user ROM 12a and the test ROM 12b. In contrast, an area in which neither the user program nor the test program is stored may exist within the ROM. Although initial defects in such an area will not be detected by the burn-in test described above, no problem will arise at the time of execution of the user program since the access to the area will not be gained in the execution of the user program.

As described in the above, according to this invention it is possible to detect the initial defects of the microcomputer by operating the parts necessary for detection of the defects while mounting the microcomputer on the same burn-in test device.

In addition, by performing the mode switching in the burn-in test by means of a reset signal, it is possible to restrain the increase in the number of terminals and in the manufacturing cost of the microcomputer. Moreover, the burn-in test can be carried out by using a burn-in test device the same as the conventional device. Furthermore, at the time of the burn-in test, the increase in the number of input signals to the microcomputer is suppressed, so that unstable operation of the microcomputer can be prevented.

Although the invention has been described with reference to a specific embodiment, this description is not meant to be construed in a limiting sense. Various modifications of the disclosed embodiment will become apparent to persons skilled in the art upon reference to the description of the invention. It is therefore contemplated that the appended claims will cover any modifications or embodiments as fall within the true scope of the invention.

What is claimed is:

1. A microcomputer possessing a test function, comprising:

user program storage means for storing a user program serving for the use of the user;

test program storage means for storing a test program for realizing said test function;

test mode setting means for setting a test mode for carrying out a burn-in test of said microcomputer;

mode switching means connected to said test mode setting means and a switching signal terminal supplied with a switching signal, and switching between a user program access mode for gaining access to said user program storage means and a test program execution mode for executing said test program stored in said test program storage means, when said test mode is set in the test mode setting means;

user program access means coupled to said mode switching means and for gaining access to a storage area in said user program storage means when said user program access mode is set in the mode switching means; and test program execution means coupled to said mode switching means and for executing said test program when said test program execution mode is set in said mode switching means, wherein said mode switching means includes frequency division means for changing an output state for every input of said switching signal, and wherein said user program access mode and said test program execution mode are switched by the output state of the frequency division means.

2. The microcomputer as claimed in claim 1, wherein said user program access means includes means for dumping the storage contents of said user program storage means.

3. The microcomputer as claimed in claim 1, wherein said switching signal comprises the reset signal of said microcomputer.

4. A microcomputer possessing a test function, comprising:

user program storage means for storing a user program serving for the use of the user;

test program storage means for storing a test program for realizing said test function;

test mode setting means for setting a test mode for carrying out a burn-in test of said microcomputer;

mode switching means connected to said test mode setting means and a switching signal terminal supplied with a switching signal, and switching between a user program access mode for gaining access to said user program storage means and a test program execution mode for executing said test program stored in said test program storage means, when said test mode is set in the test mode setting means;

user program access means coupled to said mode switching means and for gaining access to a storage area in said user program storage means when said user program access mode is set in the mode switching means; and test program execution means coupled to said mode switching means and for executing said test program when said test program execution mode is set in said mode switching means, wherein said user program access means includes means for dumping the storage contents of said user program storage means.

5. A microcomputer including user program storage means for storing a user program for use of the user and test program storage means for storing a test program for carrying out an operation test, the microcomputer comprising:

a central processing unit (CPU); and switching signal input means supplied with a switching signal at the time of burn-in test of said microcomputer, said switching signal switching access from said CPU to between said user program storage means and said test program storage means while having said microcomputer mounted on the same burn-in test device, wherein said user program storage means and test program storage means are switched access from said CPU in response to the input of said switching signal from said switching signal input means, wherein said switching signal comprises the reset signal of said microcomputer.

6. In a burn-in test method for a microcomputer provided with a user program storage means for storing a user program for service to the use of the user and a test program storage means for storing a test program for carrying out an operation test, the burn-in test method for a microcomputer, comprising: a burn-in test mode setting step of setting a burn-in test mode for burn-in testing said microcomputer, an operation mode switching step of switching the operation mode to either one of a user program access mode for gaining access to said user program storage means and a test program execution mode for executing said test program stored in said test program storage means in accordance with a reset signal from the outside when said burn-in test mode is set in the burn-in test mode setting step, a user program access step of gaining access to a storage area in said user program storage means when the operation mode is switched to said user program access mode in the operation mode switching step, and a test program execution step of executing said test program stored in said test program storage means when the operation mode is switched to said test program execution mode in said operation mode switching step, wherein the burn-in test of said microcomputer is executed by mounting said microcomputer on a burn-in test device in which the potentials applied to the terminals of said microcomputer are fixed except for a clock terminal for giving a clock signal for operating said microcomputer and a reset terminal giving said reset signal.

7. A microcomputer, comprising:

a central processing unit (CPU);

a user read-only memory (ROM) storing a user program;

a test ROM storing a test program;

a mode decoder connected to a plurality of mode set terminals supplied with a plurality of mode set signals, and generating a plurality of mode signals corresponding to operation modes of said microcomputer which include a user program access mode, a test program access mode and a burn-in test mode;

a mode switch circuit connected to a mode switch terminal supplied with a switch signal, outputting a mode switch signal in response to said switch signal; and a program access circuit coupled to said mode decoder and said mode switch circuit and activating one of first and second address lines, said first and second address lines coupled to said user ROM and said test ROM, respectively, wherein said program access circuit activates said first address in said user program access mode so that said CPU reads said user program, activates said second address in said test program access mode so that said CPU reads said test program, and activates said first and second address lines alternately in response to said mode switch signal in said burn-in test mode so that said CPU reads said user and test programs alternately, without changing said mode signals.

8. The microcomputer as claimed in claim 7, wherein said mode switch circuit comprises a frequency division circuit, which changes an output state of said frequency division circuit in response to said mode switch signal.

9. The microcomputer as claimed in claim 8, wherein said program access circuit activates said first and second address lines to have access to said user ROM and said test ROM in response to said output state of said frequency division circuit.

10. The microcomputer as claimed in claim 7, wherein said mode switch circuit comprises:
   a D flip-flop supplied with said mode switch signal as a clock signal and coupled to said program access circuit; and
   a NOR circuit supplied with said mode signal and an output signal of said D flip-flop, said D flip-flop supplied with an output signal of said NOR circuit and said mode switch signal as a clock signal.

11. The microcomputer as claimed in claim 7, wherein said mode switch signal comprises the reset signal of said microcomputer.

12. The microcomputer as claimed in claim 7, wherein said program access circuit includes means for dumping the storage contents of said user ROM.

* * * * *